US011893969B2

(12) United States Patent
Schulze

(10) Patent No.: US 11,893,969 B2
(45) Date of Patent: Feb. 6, 2024

(54) HANDHELD MUSICAL INSTRUMENT

(71) Applicant: Arne Schulze, Reno, NV (US)

(72) Inventor: Arne Schulze, Reno, NV (US)

( * ) Notice: Subject to any disclaimer, the term of this patent is extended or adjusted under 35 U.S.C. 154(b) by 0 days.

(21) Appl. No.: 18/074,421

(22) Filed: Dec. 2, 2022

(65) Prior Publication Data

US 2023/0178058 A1 Jun. 8, 2023

Related U.S. Application Data

(60) Provisional application No. 63/286,105, filed on Dec. 6, 2021.

(51) Int. Cl.
*G10H 1/34* (2006.01)
*G10H 3/00* (2006.01)

(52) U.S. Cl.
CPC ................. *G10H 1/34* (2013.01); *G10H 3/00* (2013.01); *G10H 2220/251* (2013.01); *G10H 2220/525* (2013.01); *G10H 2230/281* (2013.01)

(58) Field of Classification Search
CPC .. G10H 1/0008; G10H 2230/015; G10H 1/00; G10H 1/34; G10H 2220/135; G10H 1/348; G10H 2220/525; G10H 2220/521; G10H 1/32; G10H 1/36; G10H 7/00; G10H 2220/206; G10H 1/18; G10H 1/40; G10H 2240/131; G10H 2230/27; G10H 2210/076; G10H 1/0551; G10H 2220/461; G10H 2220/155; G10H 2220/056; G10H 2210/105; G10H 2210/381; G10H 2220/00; G10H 2220/185; G10H 1/055; G10H 3/181
See application file for complete search history.

(56) References Cited

U.S. PATENT DOCUMENTS

| | | | | |
|---|---|---|---|---|
| 5,177,311 | A * | 1/1993 | Suzuki | G10H 1/34 84/DIG. 12 |
| 5,841,052 | A * | 11/1998 | Stanton | G10H 1/34 84/113 |
| 8,111,241 | B2 | 2/2012 | Weinberg et al. | |
| 9,761,209 | B2 | 9/2017 | Cook et al. | |
| 2009/0091543 | A1 | 4/2009 | Camp, Jr. et al. | |
| 2017/0337909 | A1* | 11/2017 | Sullivan | G10H 1/0008 |
| 2018/0188850 | A1* | 7/2018 | Heath | G06F 3/0202 |
| 2021/0043177 | A1* | 2/2021 | Bar-Or | G10H 1/34 |
| 2022/0189335 | A1* | 6/2022 | Ruffner | G10H 1/0008 |
| 2023/0178056 | A1* | 6/2023 | Schulze | G10H 1/0008 84/645 |
| 2023/0178058 | A1* | 6/2023 | Schulze | G10H 1/34 84/723 |
| 2023/0178059 | A1* | 6/2023 | Schulze | G10H 1/0041 84/612 |

FOREIGN PATENT DOCUMENTS

| | | | | |
|---|---|---|---|---|
| WO | WO-2019211841 A1 * | 11/2019 | | G10H 1/0008 |
| WO | WO-2022224065 A1 * | 10/2022 | | |

* cited by examiner

*Primary Examiner* — Marlon T Fletcher
(74) *Attorney, Agent, or Firm* — Arne Schulze

(57) ABSTRACT

A handheld musical instrument for generating percussion sounds, the handheld musical instrument includes a body part with one or more sensors, a set of control buttons to select a type of audio output to be generated by said handheld musical instrument, and a handle part coupled to said body part, the handle part including the set of control buttons and operable between a first position and a second position.

17 Claims, 10 Drawing Sheets

HANDHELD MUSICAL INSTRUMENT

CROSS- REFERENCE TO RELATED APPLICATIONS

The present Utility patent application claims priority benefit of the [U.S. provisional application for patent serial number #63/286,105, titled, "Handheld Electronic Percussion Instrument", filed on 2021 DEC. 06 under 35 U.S.C. 119(e). The contents of this/these related patent application(s) is/are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to electronic percussion instruments. More particularly, certain embodiments of the invention relate to handheld electronic percussion instruments.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Electronic percussion instruments mimic traditional acoustic drum kits with electronic triggers corresponding to the various drums and cymbals of an acoustic kit. Striking a pad triggers a drum machine to play a percussion sound or sounds assigned to the pad or pads. A percussionist plays these types of electronic percussion instruments with sticks in the same way that an acoustic drum kit would be played.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that electronic percussion instruments have an array of triggers on a flat playing surface that, when struck with a drumstick or a player's hand, trigger corresponding individual single electronic percussion sounds to be played. The electronic percussion instruments are stationed in one place.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
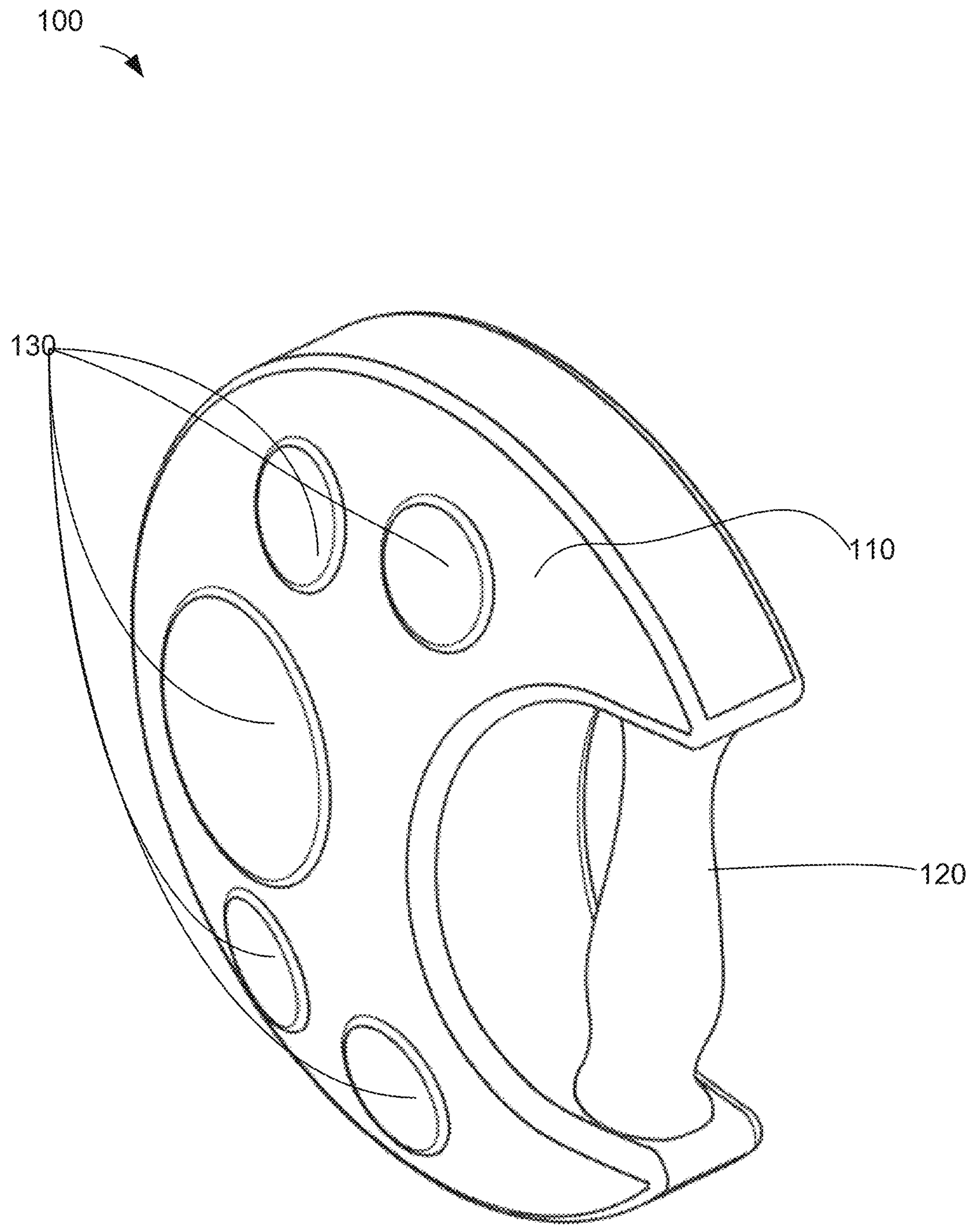
FIG. 1 illustrates a front perspective view of an electronic percussion instrument, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see *Ex parte Mallory*, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.*, Civ. App. 96-1264, slip op. at 10 (Fed. Cir. Jul. 3, 1997) (unpublished) *Hybridtech* v. *Monoclonal Antibodies, Inc.,* 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.,* 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See *In re Frye*, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.,* 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearward most point of the upper or outsole.

Similarly, the term 'substantially' is well recognized in case law to have the dual ordinary meaning of connoting a term of approximation or a term of magnitude. See *Dana Corp.* v. *American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.,* 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.,* 347 F.3d 1314, 1322 (Fed. Cir. 2003); *Epcon Gas Sys., Inc.* v. *Bauer Compressors, Inc.,* 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp*. v. *Vaughan Co.,* 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp*. v. *Medtronic AVE, Inc.,* 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.,* 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude, e.g., see *Deering Precision Instruments, L.L.C*. v. *Vector Distrib. Sys., Inc.,* 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc*. v. *Bauer Compressors, Inc.,* 279 F.3d 1022 (Fed. Cir. 2002) (construing the terms "substantially constant" and "substantially below"); *Zodiac Pool Care, Inc*. v. *Hoffinger Indus., Inc.,* 206 F.3d 1408 (Fed. Cir. 2000) (construing the term "substantially inward"); *York Prods., Inc*. v. *Cent. Tractor Farm & Family Ctr.,* 99 F.3d 1568 (Fed. Cir. 1996) (construing the term "substantially the entire height thereof"); *Tex. Instruments Inc*. v. *Cypress Semiconductor Corp.,* 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp*. v. *Sollac,* 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit —"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp*. v. *Micron Separations, Inc.,* 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.,* 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp*. v. *Gabriel Elecs. Inc.,* 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc*. v. *Envirochem, Inc.,* 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc*. v. *Envirochem Inc.,* 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp*. v. *Micron Seps.,* 66 F.3d 1211, 1217, 36 USPQ2d 1225, 1229 (Fed. Cir. 1995); see, e.g., *Andrew Corp*. v. *Gabriel Elecs. Inc.,* 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory*, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In *re Hutchison*, 104 F.2d 829, 42 USPQ 90, 93 (C.C.P.A. 1939) the court said, "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred, or induced by any pattern(s) of description, embodiments, examples, or referenced prior art that may (or may not) be provided in the present patent.

References to "end user", or any similar term, as used herein, is generally intended to mean late-stage user(s) as opposed to early-stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like.

It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C . . . sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . .", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see *Norian Corp.* v *Stryker Corp.,* 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms.

Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s). Furthermore, any statement(s), identification(s), or reference(s) to a structure(s) and/or element(s) that corresponds to and/or supports a claim limitation(s) phrased in functional limitation terms covered by 35 USC § 112(6) (post AIA 112(f)) should be understood to be identified by way of example and not limitation, and as such, should not be interpreted to mean that such recited structure and/or element is/are the only structure(s) and/or element(s) disclosed in this patent application that corresponds to and/or supports such claim limitations phrased in functional limitation terms. This claims interpretation intention also applies to any such subsequent statements made by Applicant during prosecution.

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Embodiments of the present invention disclose a handheld electronic percussion instrument. The handheld electronic percussion instrument comprises a body part and a handle or a handlebar part. The handle part may be attached to the body part, detachably attached to the body part, or swivelable about the body part. One side of the body part comprises a set of pads, for example, without limitations, rubber pads. The rubber pads are attached to pressure sensitive sensor, such as without limitations a piezoelectric sensor. When a user of the handheld percussion instruments strikes the rubber pads by finger or by hand the piezoelectric sensor is triggered and generates sound files for example, without limitations, digital drum sound files. The handle part of the handheld electronic percussion instrument comprises buttons enabling the user to select different program styles, such as, without limitation, a drum and percussion style program, a Musical Instrument Digital Interface (MIDI) percussion or musical sequences. The buttons may be operated with a finger or thumb trigger. The triggers from the body part and the handle part are wired to an internal sound module. Sequential striking of the triggers causes corresponding percussion sounds to be played by the handheld electronic percussion instrument. The sounds may be amplified and broadcast through loudspeakers controllers connected to the internal sound module. The loudspeakers controller may be wired or wirelessly connected to the internal sound module.

Figure 2:
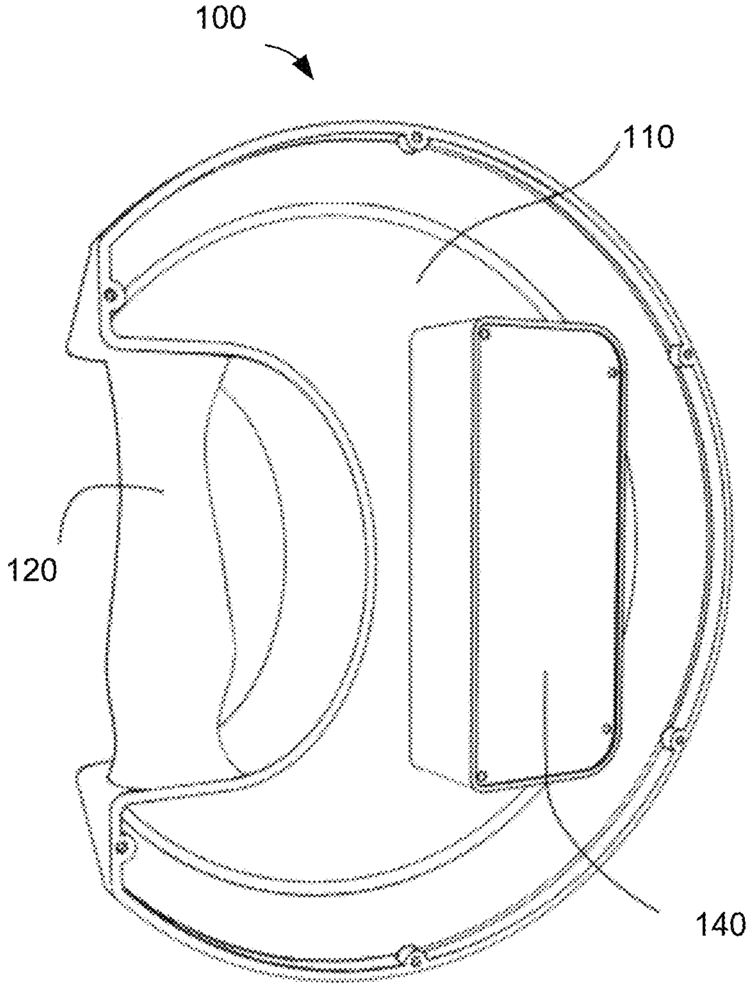
FIG. 2 illustrate a back perspective view of an electronic percussion instrument, in accordance with an embodiment of the present invention.

FIGS. 1-2 illustrate a front and back perspective view of a handheld electronic percussion instrument 100. FIG. 1 illustrates a front view of instrument 100. Instrument 100 includes a body part 110 and a handle part 120. In the present embodiment handle part 120 is attached to body part 110. Body part 110 includes one or more sensor pads 130. Sensor pads 130 are for example, without limitation, piezoelectric sensor pads. Piezoelectric sensor pads comprise a rubber pad, a metal plate, piezoelectric sensor, and a foam layer. FIG. 2 illustrates a back view of instrument 100. Instrument 100 includes a microprocessor 140 performing the function of an internal sound module. When one or more of the piezoelectric sensor pads 130 is struck with a hand or a finger of a percussionist, the internal sound module micro processer 140 produces a sound whose volume level is directly related to the force of impact on the one or more piezoelectric sensor pads 130. The sound produced may include sounds such as, without limitations, a drum sound, a musical sequence, or other preset audio played by the internal sound module 140. The played sound is transmitted to an amplifier wirelessly or using a wired medium. For example, without limitations, the amplifier includes a loudspeaker.

Figure 3:
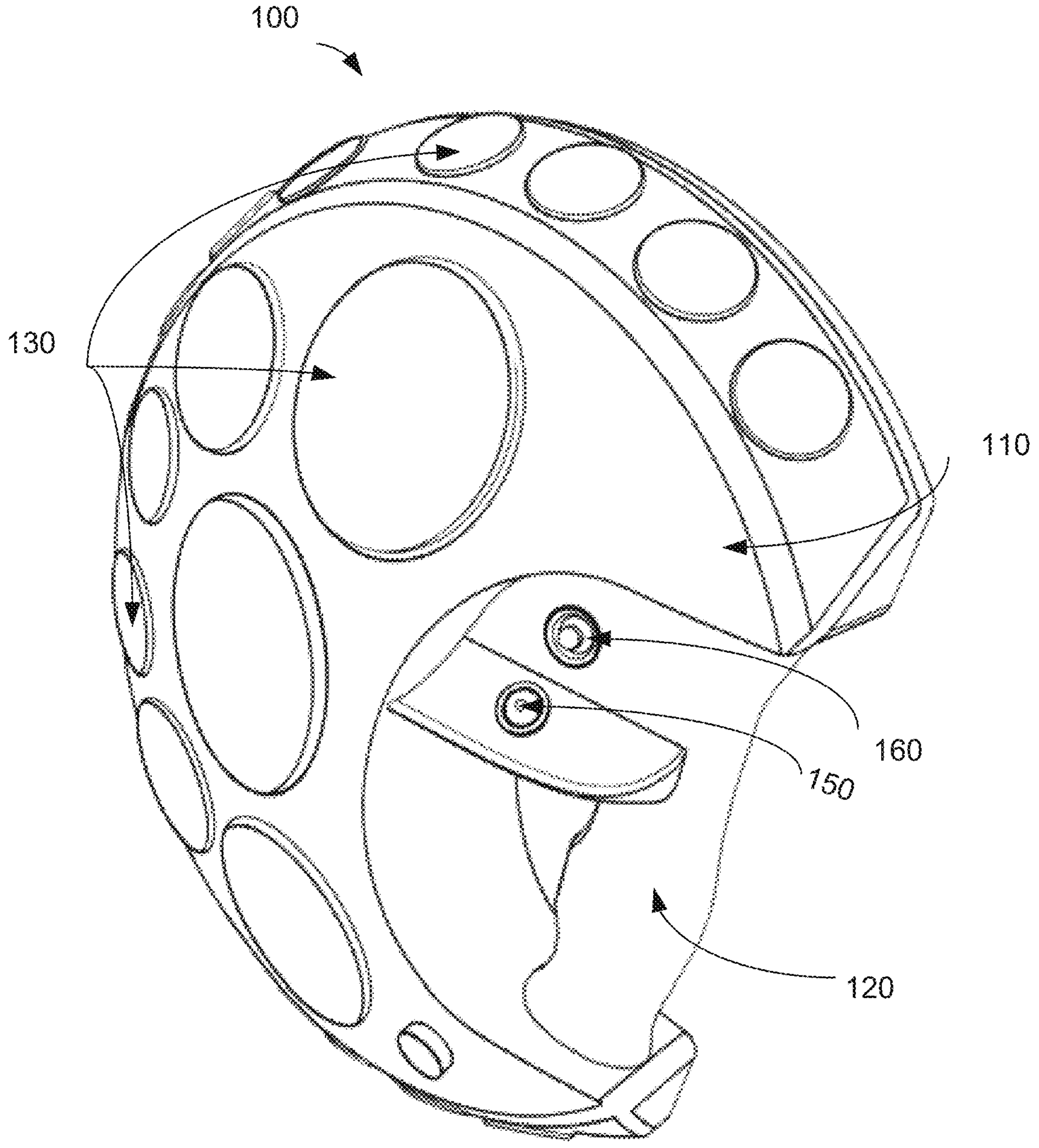
FIG. 3 illustrates an arrangement of sensor pads and control buttons in an electronic percussion instrument, in accordance with an embodiment of the present invention.
Figure 4:
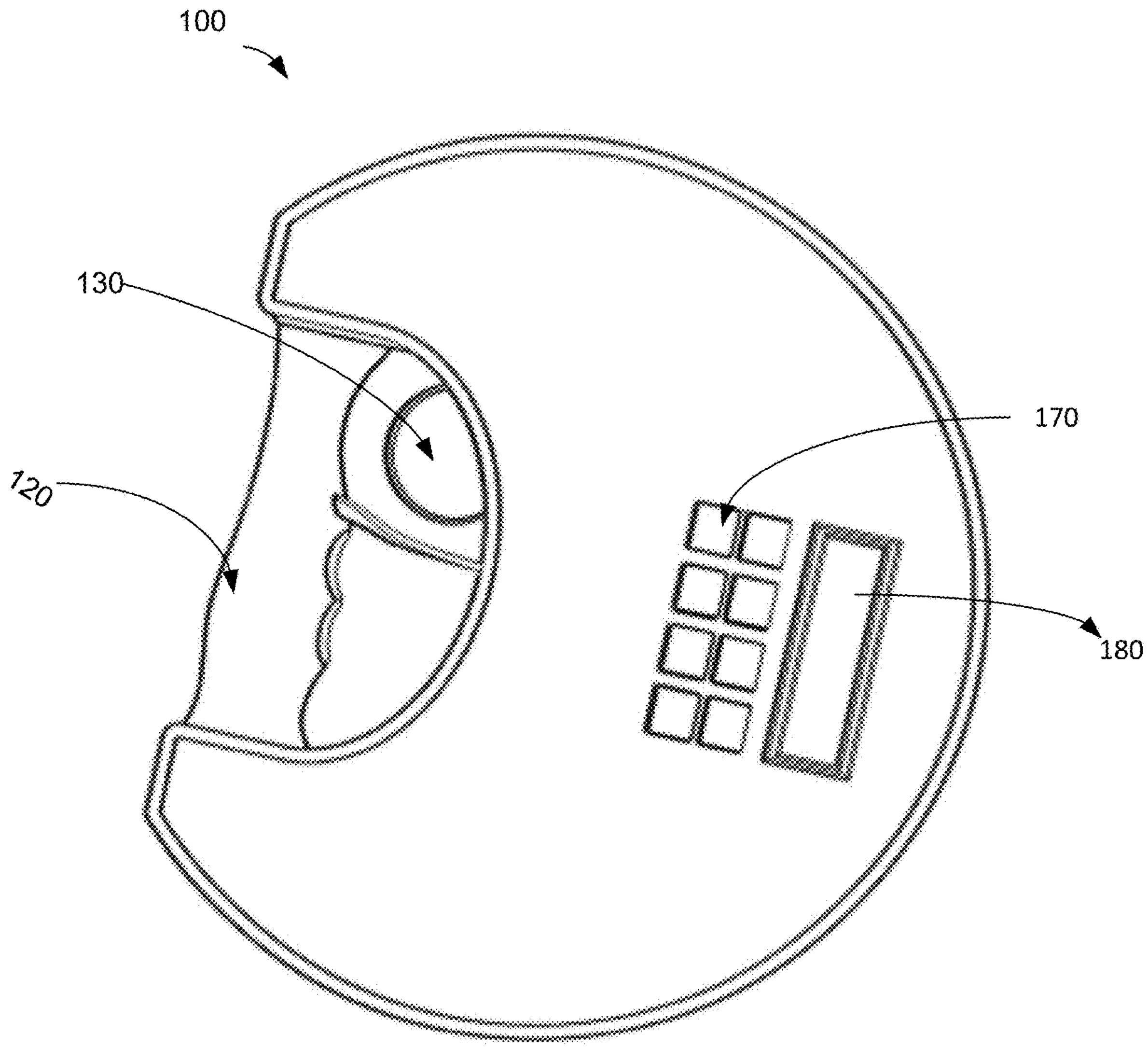
FIG. 4 illustrates an arrangement of control buttons and a LED panel in an electronic percussion instrument, in accordance with an embodiment of the present invention.

FIG. 3 illustrates an arrangement of sensor pads and control buttons in instrument 100, in accordance with an embodiment of the present invention. In the present embodiment, instrument 100 comprises a thumb joystick button 160 and a thumb programmable monetary push button switch 150 on the handle part 120. Joystick button 160 and push button switch 150 enables user of instrument 100 to select additional multiple programmable user performance functions, such as, without limitations, a preset change, a tempo changes in addition to triggering additional individual sounds or percussion sound file loops. The multiple programmable user performance functions may be selected using either joystick button 160 or push button switch 150. Further, the push button switch 150 may be a force-sensing resistor that changes its resistive value (in ohms Ω) depending on how much it is pressed, providing an additional sound variation functionality. FIG. 4 illustrates an arrangement of piezoelectric sensor, control buttons and an LED panel in instrument 100, in accordance with an embodiment of the present invention. A piezoelectric sensor pad 130 is connected to the handlebar 120. The piezoelectric sensor pad 130 may be triggered by the index finger of the hand used by the user to hold instrument 100, triggering e.g., a kick drum or other sound file. Further, the backplate of the body part 110 comprises programmable controller buttons 170 and an LED (light emitting diode) screen 180. Programmable controller buttons 170 provides user with the main overview and control of the sound modules parameters and sound library options and general settings associated with electronic percussion instruments. LED screen 180 displays information related to programs selected by controller buttons 170.

Figure 5:
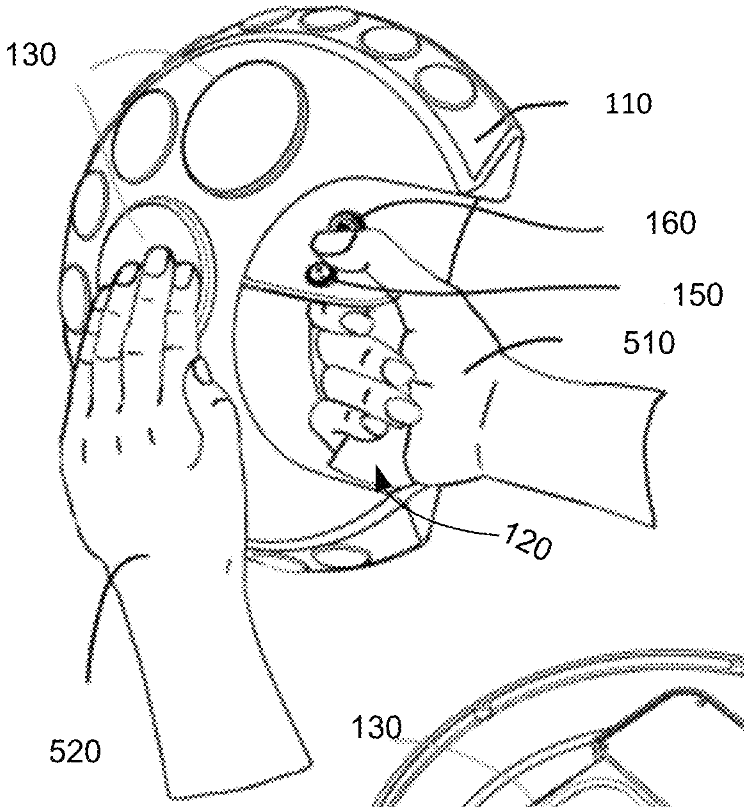
FIG. 5 illustrates a hand position of a user of an electronic percussion instrument, in accordance with an embodiment of the present invention.
Figure 6:
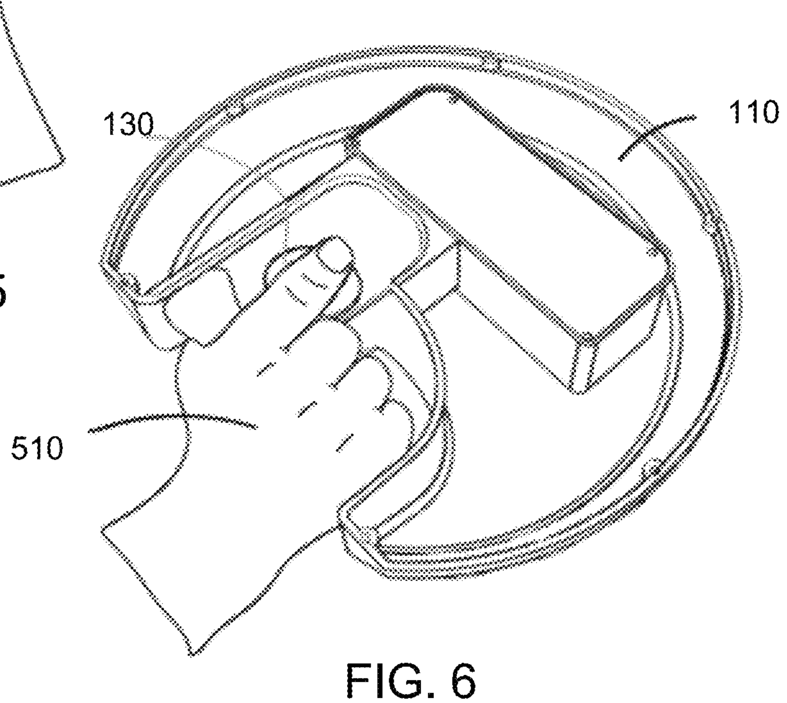
FIG. 6 illustrates a back view of the hand position of a user of an electronic percussion instrument, in accordance with an embodiment of the present invention.

FIGS. 5 and 6 illustrate a hand position of a user of an electronic percussion instrument, in accordance with an embodiment of the present invention. For example, without limitations, FIG. 5 shows the user's left hand 520 striking sensor pads 130, while the user's right hand 510 is holding handle 120 and controlling the preset performance settings using push button 150 and joystick. The preset performance setting may include, such as, without limitations, an accoustic drum Kit, arock drum kit, a hip hop kit, alatin percussion set, etc., FIG. 6 shows another example of the hand position of the user. In another example, without limitations, user holds handle part 120 with right hand 510 and strikes piezoelectric sensor pad 130 placed on the back side of the instrument body 110 with an index finger of right hand 510. This action provides, for example, without limitations, the user to trigger a Kick Drum sound file, wherein while the hand 520 in FIG. 5 is triggering snare drum sound file the users hand thumb 510 is triggering a looped HI Hat sequence sound file.

Figure 7:
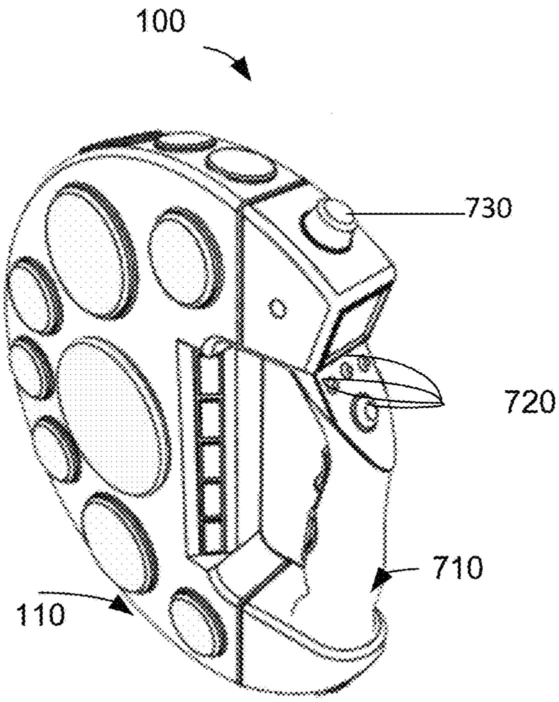
FIG. 7 illustrates a handle position of an electronic percussion instrument with respect to a right-handed user, in accordance with an embodiment of the present invention.

FIG. 7 illustrates a first position of handle part 710 of instrument 100 with respect to a right-handed user, in accordance with an embodiment of the present invention. In FIG. 7, instrument 100 is shown with a detachable handle part 710 attached to body part 110 in the first position. The first position enables a right-handed user to use control buttons 720 with fingers of the right hand. Control buttons 720 enable user to select one of different program styles, such as, without limitation, a drum and percussion style program, a Musical Instrument Digital Interface (MIDI) percussion or musical sequences. Detachable handle 710 may be detached using button 730 on handle 710 or by any other means.

Figure 8:
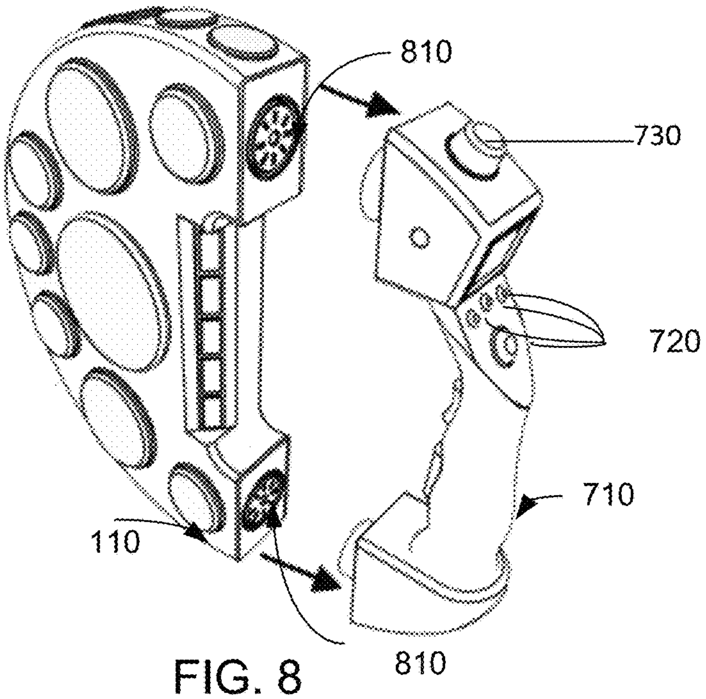
FIG. 8 illustrates the handle detached from the body of an electronic percussion instrument, in accordance with an embodiment of the present invention.

FIG. 8 illustrates handle part 710 detached from the body 110 of instrument 100, in accordance with an embodiment of the present invention. In FIG. 8, instrument 100 is shown with handle part 710 detached from body part 110. Handle part 710 is detached from body part 110 at points 810. The detachable handle part 710 enables the use of instrument 100 by both right-handed and left-handed users with similar ease. In one embodiment, handle part 710 is completely detached from body part 110 from its first position and rotated by 180 degrees and attached back to body part 110 in a second position for the playing of instrument 100 by a different-handed user and is illustrated below with reference to FIGS. 9-10. The first and second positions illustrate the different operating position for users with different hand usage pattern, not limited to first position for right-handed users and second position for left-handed users.

Figure 9:
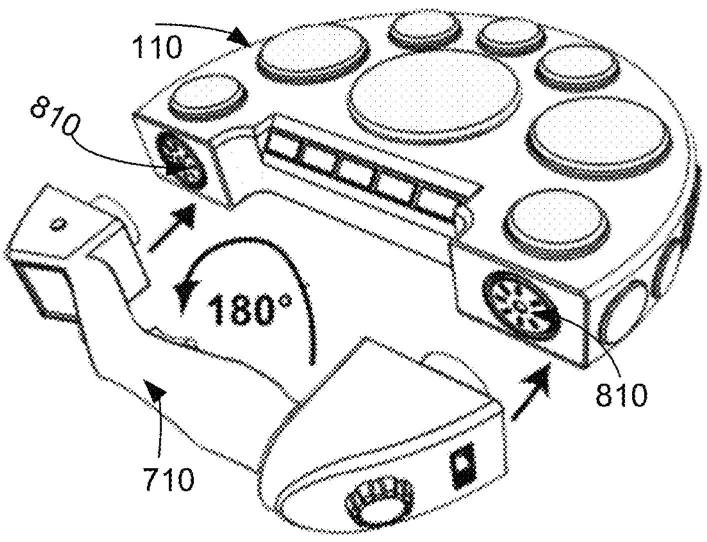
FIG. 9 illustrates rotating the handle at a particular angle with respect to the body of an electronic percussion instrument, in accordance with an embodiment of the present invention.

FIG. 9 illustrates rotating the handle part 710 at a particular angle with respect to the body of an electronic percussion instrument, in accordance with an embodiment of the present invention. In FIG. 9, detached handle part 710 is shown to be rotated by 180 degrees with respect to body part 110. For example, without limitations, handle part 710 is flipped for use by a different hand type user.

Figure 10:
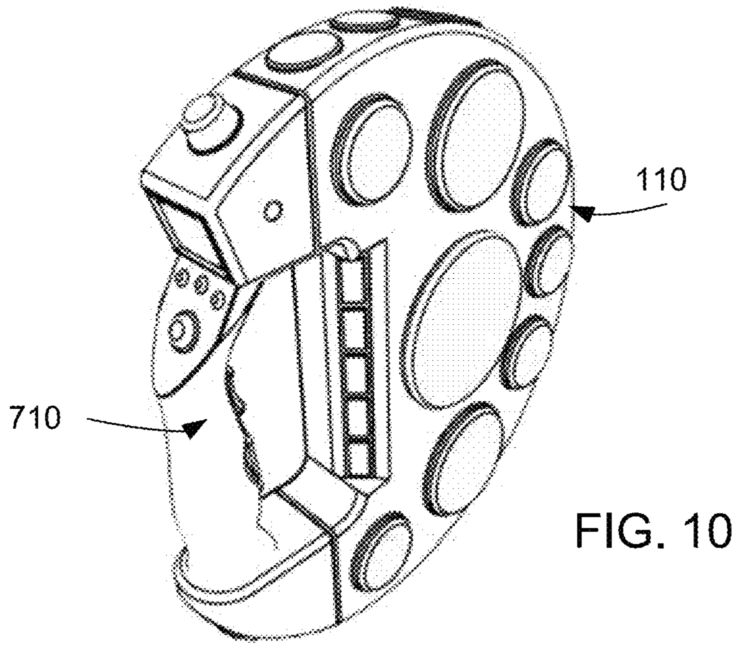
FIG. 10 illustrates a second position of a handle of an electronic percussion instrument with respect to a left-handed user, in accordance with an embodiment of the present invention.

FIG. 10 illustrates a second position of handle part 710 of an electronic percussion instrument with respect to a left-handed user, in accordance with an embodiment of the present invention. In FIG. 10, instrument 100 is shown with a detachable handle part 710 attached to body part 110 in the second position. The second position enables a left-handed user to use control buttons 720 with fingers of the left hand. Control buttons 720 enable user to select one of different program styles, such as, without limitation, a drum and percussion style program, a Musical Instrument Digital Interface (MIDI) percussion or musical sequences.

Figure 11A:
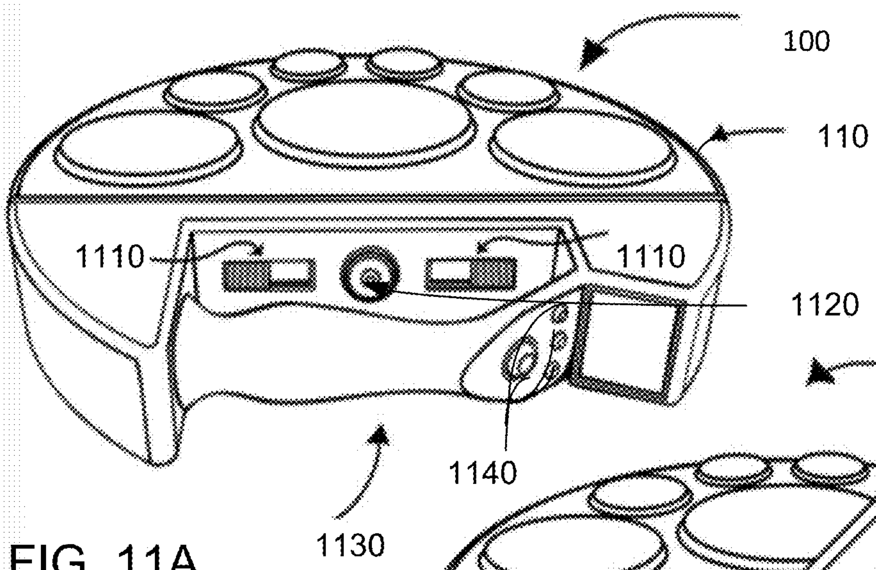
FIG. 11A illustrates a first position of a swivelable handle with respect to an electronic percussion instrument, in accordance with an embodiment of the present invention.
Figure 11B:
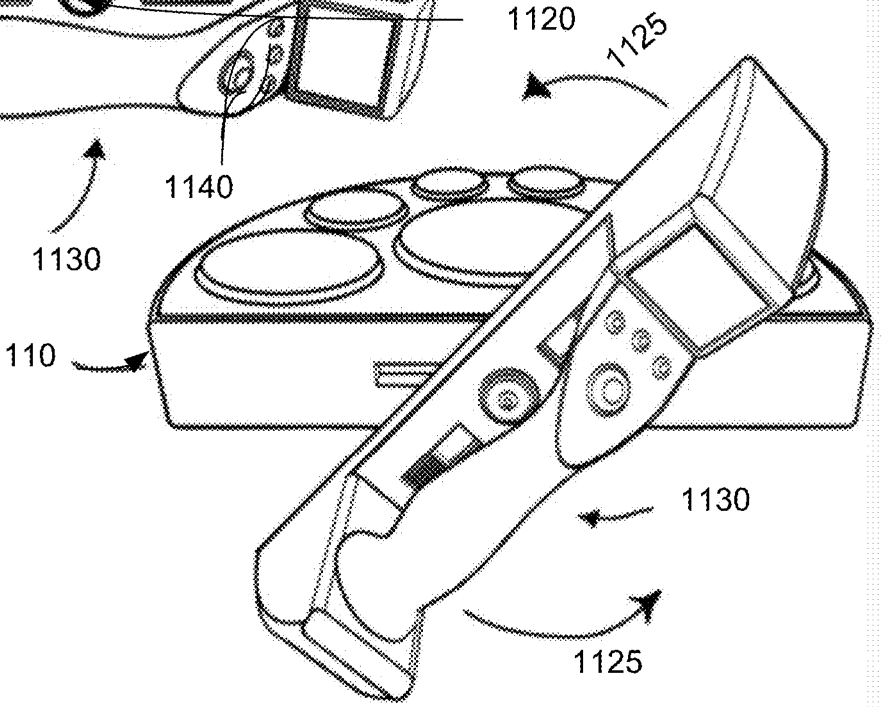
FIG. 11B illustrates a second position of a swivelable handle with respect to an electronic percussion instrument, in accordance with an embodiment of the present invention.
Figures 11C, 11D:
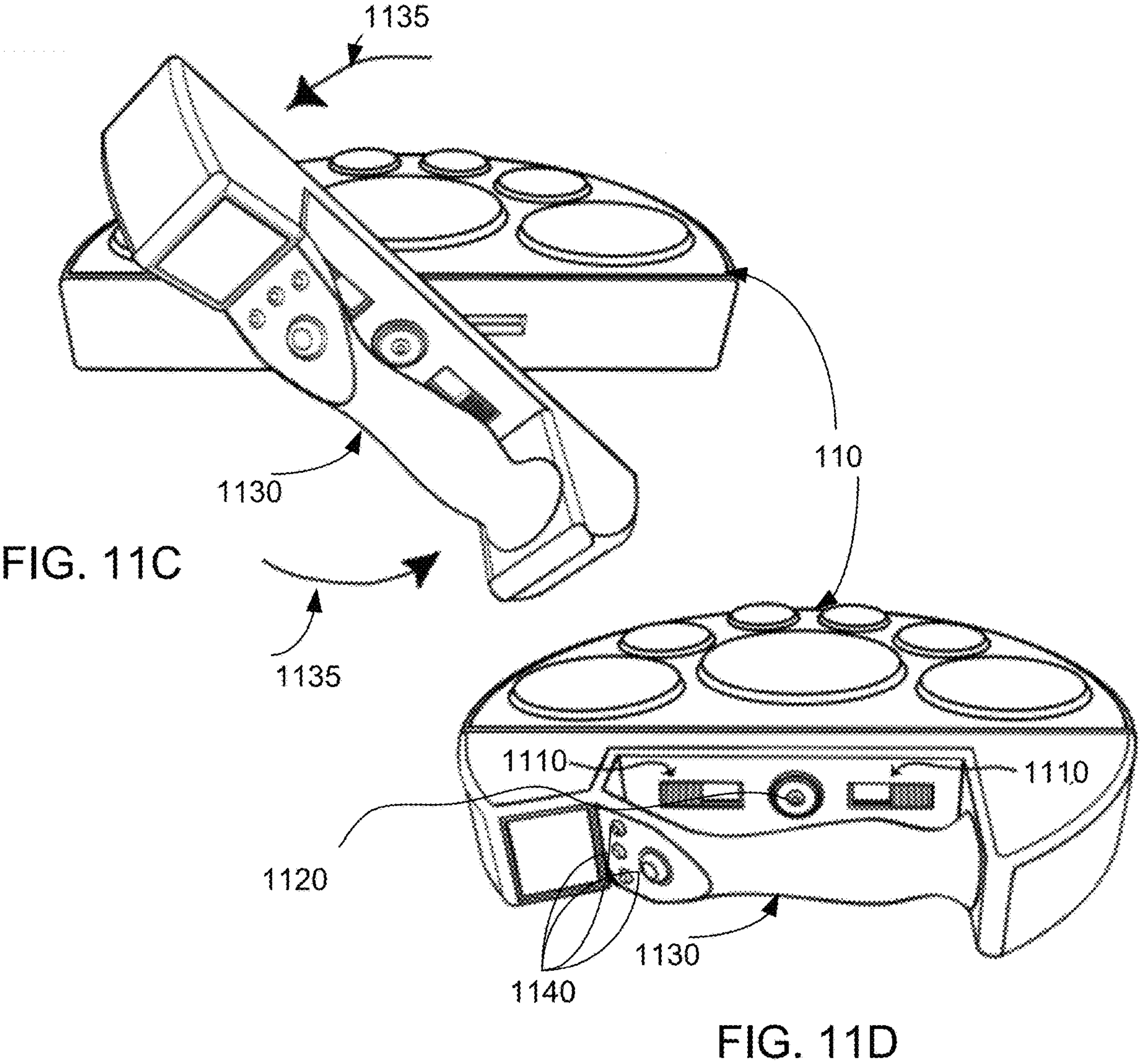
FIG. 11C illustrates a third position of a swivelable handle with respect to an electronic percussion instrument, in accordance with an embodiment of the present invention.
FIG. 11D illustrates a fourth position of a swivelable handle with respect to an electronic percussion instrument, in accordance with an embodiment of the present invention.

FIGS. 11A-11D illustrate various positions of a swivelable handle with respect to an electronic percussion instrument, in accordance with an embodiment of the present invention. In another embodiment, handle part 1130 is pivotably attached to body part 110 of instrument 100. Handle part 1130 is swivelable or rotatable with respect to the pivotable point. In FIG. 11A, instrument 100 is shown with a swivelable handle 1130 attached to body part 110 at pivot point 1120 in a first position. Swivelable handle 1130 is provided with locks 1110 on either side of pivot point 1120 for locking handle 1130 with body part 110. In FIG. 11A, the first position of swivelable handle 1130 is shown with control buttons 1140 in a first position for use by a right-handed user. In FIG. 11B, aa second position of swivelable handle 1130 is shown, wherein handle 1130 is rotated by 45 degrees 1125 with respect to the body part 110, about pivot point 1120. In FIG. 11C, a third position of swivelable handle 1130 is shown, wherein handle 1130 is rotated by 135 degrees 1135 with respect to the body part 110, about pivot point 1120. In FIG. 11D, instrument 100 is shown with a swivelable handle 1130 attached to body part 110 at pivot point 1120 in a fourth position. In FIG. 11D, the fourth position of swivelable handle 1130 is shown with control buttons 1140 in a second position for use by a left-handed user. A movable handle 1130 provides similar ease of use of instrument 100 for users with different hand usage patterns.

Figure 12:
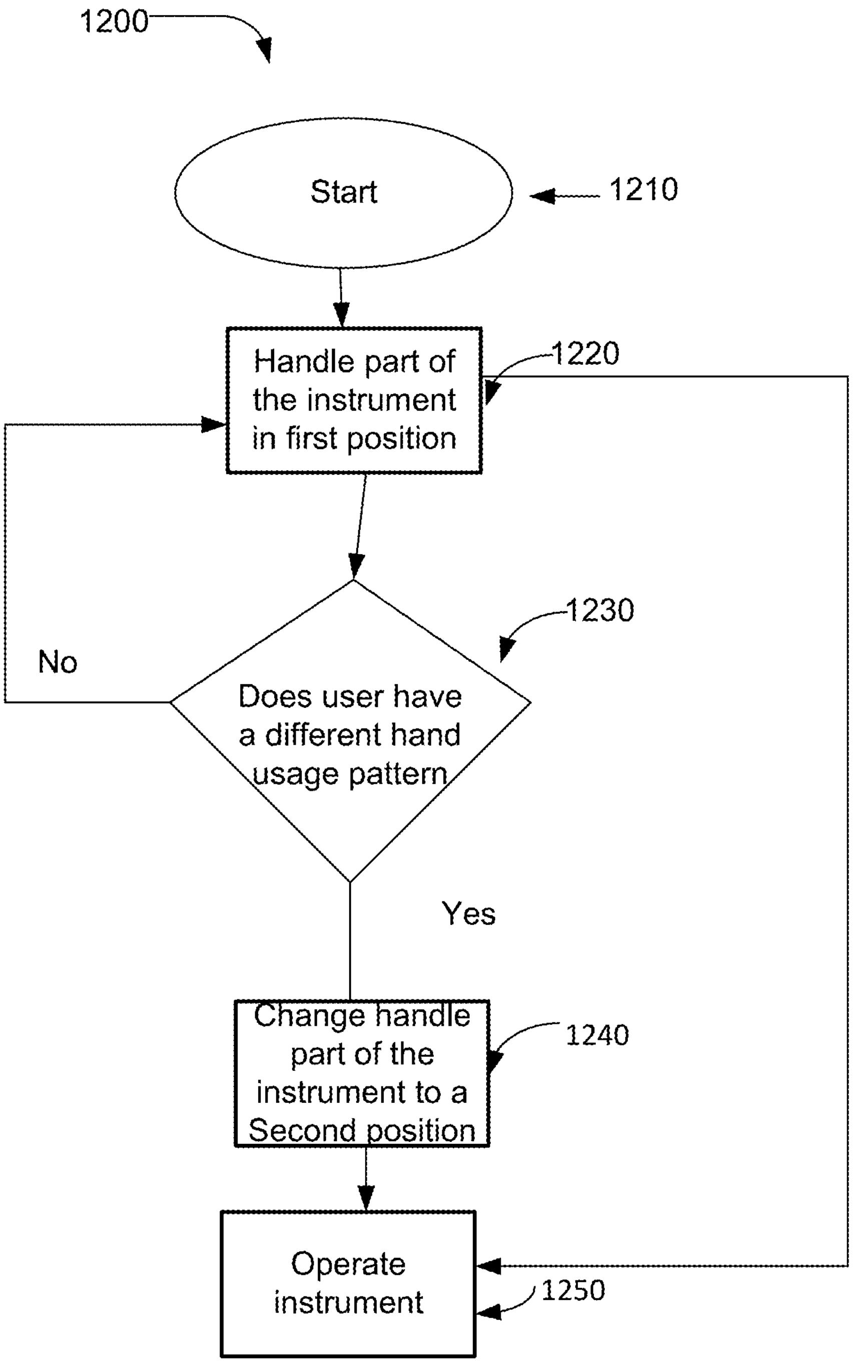
FIG. 12 illustrates a method for changing the position of the handle of an electronic percussion instrument, in accordance with an embodiment of the present invention.

FIG. 12 illustrates a method for changing the position of the handle of an electronic percussion instrument, in accordance with an embodiment of the present invention. In FIG. 12, a flow chart describes method 1200 for changing the position of handle part 710, 1130 with respect to body part 110 to enable users with different hand usage patterns to use instrument 100. At initial step 1210, instrument 100 includes the handle part attached with respect to the body part 120. For example, without limitations, the handle part may include a detachable handle part 710 of FIG. 7 or a swivelable handle part 1130 of FIG. 11A. At step 1220, the handle part 710 of FIG. 7 or handle part 1130 of FIG. 11A is in a first position for use by a user having a first type of hand usage. For example, without limitations, the first position of the handle part 710, 1130 may be suitable for a right-handed user. At step 1230, a determination is made if the user has a first type of hand usage or a second type of hand usage. If the user has second type of hand usage, then at step 1240 the handle is changed from the first position to the second position. For example, without limitation, if the handle part is a detachable handle part 710 of FIG. 7, handle 710 is detached from body 110, flipped or rotated by 180 degrees and attached back to body part 110. In another example, if the handle part is a swivelable handle 1130 of FIG. 11A, the handle 1130 is swiveled or rotated about a pivot point 1120 and locked in for use in the second position using locking pins 1110. At step 1250, the flipping or swiveling action enables user of a different hand usage to use or operate instrument 100 with ease. On the other hand, if the user has a first type of hand usage there is no change in the handle position and the user continues to operate instrument 100 with handle in the first position.

All the features disclosed in this specification, including any accompanying abstract and drawings, may be replaced by alternative features serving the same, equivalent, or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing a handheld electronic percussion instrument according to the present invention will be apparent to those skilled in the art. Various aspects of the invention have been described above by way of illustration, and the specific embodiments disclosed are not intended to limit the invention to the particular forms disclosed. The particular implementation of the handheld electronic percussion instrument may vary depending upon the particular context or application. By way of example, and not limitation, the handheld electronic percussion instrument described in the foregoing were principally directed to different constructional techniques of the handheld electronic percussion instrument for use by different types of users; however, similar techniques may instead be applied to implement light weight musical devices that may be easily transported , which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A handheld musical instrument that is suitable for being firmly held by one hand of a person while being fully operated by both hands of the person regardless of whether the holding hand is the right or the left hand, said handheld musical instrument comprising:

a body having one or more embedded controls that each control an aspect of music generated by the handheld musical instrument;

a handle connected to said body for holding said handheld instrument;

wherein said handle has a shape that permits it to be firmly grasp by either the right or left hand of the person;

wherein said handle has one or more embedded controls that each control an aspect of the music generated by said handheld musical instrument including selecting sound module parameters and sound library options;

wherein said handle comprises an embedded display that displays information relating to the music; and wherein said handle comprises one or more connectors for firmly connecting the handle to the body while in a first position with respect to the body;

wherein said connectors permit the handle to be rotated 180 degrees to a second position with respect to the body about an axis that runs through both the body and the handle allowing said first position for right-handed play and said second position for left-handed play of said handheld instrument;

wherein said connectors provide a firm connection in either said first position or said second position.

2. The handheld musical instrument of claim 1, wherein at least one of the embedded controls in the body is a pressure sensitive sensor.

3. The handheld musical instrument of claim 2, wherein said pressure sensitive sensor is a piezoelectric sensor.

4. The handheld musical instrument of claim 2, wherein the pressure sensitive sensor generates an audio signal in response to an applied trigger.

5. The handheld musical instrument of claim 1, wherein the handle includes an embedded control that is a pressure sensitive sensor.

6. The handheld musical instrument of claim 1, wherein the handle must be completely detached from the body before it can be rotated 180 degrees with respect to the body about the axis.

7. The handheld musical instrument of claim 6, wherein the handle has two ends and the one or more connectors include a connector near each end of the handle that releasably connects to the body.

8. The handheld musical instrument of claim 1 further comprising one or more locks that releasably lock the position of the handle relative to the body when in both the first and the second positions.

9. The handheld musical instrument of claim 1 wherein the handle has a center point and the axis about which the handle rotates passes through the center point.

10. The handheld musical instrument of claim 1 wherein the body has a center point and the axis about which the handle rotates passes through the center point.

11. The handheld musical instrument of claim 10 wherein the handle also has a center point and the axis about which the handle rotates also passes through the center point of the handle.

12. The handheld musical instrument of claim 1 wherein the handle has one or more curved indentations that accommodate one or more fingers on the hand when they are wrapped around the handle to firmly hold the handle.

13. The handheld musical instrument of claim 1 wherein the handle has two ends and at least one control that controls an aspect of the music embedded in the handle close to one end and far from the other end.

14. The handheld musical instrument of claim 1 wherein the handle has two ends and at least one display that displays information relating to that music embedded in the handle close to one end and far from the other end.

15. A method for adjusting the handle of the handheld musical instrument of claim 1 to move it from the first position relative to the body to the second position relative to the body, the method comprising releasing the firm connection between the handle and the body while in the first position;

rotating the handle 180 degrees with respect to the body about the axis; and firmly connecting the handle to the body while in the rotated position.

16. The method of claim 15 further comprising:

completely detaching the handle from the body before the rotating; and reattaching the handle to the body after the rotating.

17. The method of claim 15, wherein the step of rotating the handle 180 degrees with respect to the body about the axis includes rotating the handle.

* * * * *